United States Patent Office 3,541,073
Patented Nov. 17, 1970

3,541,073
PROCESS FOR THE MANUFACTURE OF POLY-
ISOPRENE HAVING A HIGH CIS-1,4-CON-
FIGURATION
Takashi Nishida and Kazuo Itoi, Kurashiki, Okayama,
Japan, assignors to Kurashiki Rayon Co., Ltd., Kura-
shiki, Japan, a corporation of Japan
No Drawing. Filed Oct. 16, 1968, Ser. No. 768,190
Claims priority, application Japan, Oct. 24, 1967,
42/68,444; Dec. 5, 1967, 42/78,836
Int. Cl. C08d 3/10
U.S. Cl. 260—94.3                                10 Claims

ABSTRACT OF THE DISCLOSURE

Polymerization of isoprene with a catalyst prepared by reacting (1) a first component obtained by the reaction of an organo-tin hydride having at least one Sn—H bond in its molecule with titanium tetrachloride, the molar ratio of the Sn—H bond to the titanium being within the range of 0.5 to 6.0, and subsequent removal of at least a quarter, preferably substantially all, of hydrocarbon-soluble substances from the reaction mixture, with (2) an organo-aluminium compound as a second component, the molar ratio of the aluminium to the titanium being within the range of 0.01 to 0.5.

---

This invention concerns a process for the manufacture of polyisoprene having a high cis-1,4-configuration.

One of the inventors of this invention discovered that a reaction product obtained by reacting an organo-tin hydride having at least one Sn—H bond in its molecule with titanium tetrachloride in an inert hydrocarbon solvent with the molar ratio of the Sn—H bond to the titanium (Sn—H/Ti) being maintained at at least 2 has an ability of polymerising isoprene to polyisoprene having a high cis-1,4-configuration, and proposed a process for preparation of cis-1,4-polyisoprene in which such a reaction product is used as a catalyst (Japanese patent application publication No. 14460/1967). It is known on the other hand that a product obtained by reacting an organo-tin hydride with titanium tetrachloride at an Sn—H/Ti molar ratio of less than 2 is unsuitable for the production of polyisoprene having a high cis-1,4 content.

It has now been found that a catalyst for polymerising isoprene to polyisoprene having a high cis-1,4 content which has a higher polymerisation activity and has an ability to form a polymer with a higher molecular weight than the catalyst (organo-tin hydride/titanium tetrachloride) proposed in Japanese patent application publication No. 14460/1967 is obtained by reacting a first component obtained by the reaction of an organo-tin hydride having at least one Sn—H bond in its molecule with titanium tetrachloride in an inert hydrocarbon solvent, the molar ratio of the Sn—H bond to the titanium (Sn—H/Ti) being within the range of 0.5 to 6.0, and subsequent removal of at least a quarter of hydrocarbon-soluble substances from the reaction mixture, with an organoaluminum compound as a second component, the molar ratio of the aluminium to the titanium (Al/Ti) being within the range of 0.01 to 0.5.

Accordingly, the invention provides a process for the manufacture of polyisoprene having a high cis-1,4-configuration comprising contacting isoprene in an inert hydrocarbon solvent with a catalyst, characterised in that the said catalyst is prepared by reacting a first component obtained by the reaction of an organo-tin hydride having at least one Sn—H bond in its molecule with titanium tetrachloride in an inert hydrocarbon solvent, the molar ratio of the Sn—H bond to the titanium (Sn—H/Ti) being within the range of 0.5 to 6.0, and subsequent removal of at least a quarter of hydrocarbon-soluble substances from the reaction mixture, with an organo-aluminium compound as a second component, the molar ratio of the aluminium to the titanium (Al/Ti) being within the range of 0.01 to 0.5.

The removing of at least a quarter, preferably substantially all, of hydrocarbon-soluble substances from a reaction product of an organo-tin hydride and titanium tetrachloride is critical. This is especially so when the reaction product is obtained at an Sn—H/Ti molar ratio as low as 0.5 to 2.0. When the Sn—H/Ti molar ratio is low, it is imperative to remove substantially all of the hydrocarbon-soluble components from the reaction product. Otherwise, polyisoprene having a high cis-1,4 content would not be obtainable. If the reaction product is obtained at the Sn—H/Ti molar ratio as high as 3.0 to 6.0, the resulting catalyst has an ability to polymerise isoprene to polyisoprene having a high cis-1,4 content even if the hydrocarbon-soluble substances are removed from the reaction product. Without the removal of the hydrocarbon-soluble substances, however, the resulting catalyst is low in polymerisation activity and yields a polymer having a low molecular weight. Even if the molar ratio of Sn—H/Ti is high, therefore, it is necessary to remove at least a quarter of hydrocarbon-soluble substances from a reaction product of an organo-tin hydride and titanium tetrachloride, and the substantial removal of the hydrocarbon-soluble substances is advantageous.

As the organo-tin hydride used in reaction with titanium tetrachloride to produce the catalyst of the invention, an organo-tin hydride of the formula:

$$R_mSnH_{4-m}$$

wherein R is a hydrocarbyl group and m is a number of 1, 2 or 3, is advantageous in view of the ease of production and purification, stability and simplicity of handling. The hydrocarbyl group R may be the same or different, and represent an alkyl group having 1 to 8 carbon atoms, alkenyl group having 3 to 8 carbon atoms, cycloalkyl group having 5 to 8 carbon atoms, mononuclear aryl group having 6 to 8 carbon atoms and mononuclear aralkyl group having 7 to 10 carbon atoms. The number m should preferably be 2 or 3, especially 3. Examples of preferable organo-tin hydrides are trialkyl tin monohydrides such as trimethyl tin monohydride, triethyl tin monohydride, tripropyl tin monohydride and tributyl tin monohydride; triaryl tin monohydride such as triphenyl tin monohydride; and dialkyl tin dihydrides such as dimethyl tin dihydride, diethyl tin dihydride, dipropyl tin dihydride and dibutyl tin dihyride.

The reaction between the organo-tin hydride and titanium tetrachloride is effected by stirring both components in an inert gaseous atmosphere in an inert hydrocarbon solvent or diluent. Preferably inert hydrocarbon solvents include aliphatic saturated hydrocarbons such as pentane, hexane, heptane and octane; cycloaliphatic saturated hydrocarbons such as cyclopentane and cyclohexane; and aromatic hydrocarbons such as benzene, toluene and xylene. The reaction may be carried out at a temperature in the range from −30° C. to 100° C., especially preferably in the range of 0° C. to 60° C. At a temperature below −30° C., the reaction is slow, and at a temperature in excess of 100° C., the catalyst activity is lowered. The concentrations of the reaction materials in the solvent vary according to the reaction temperature and time, but it is from 5 moles/litre to 0.05 mole/litre, preferably 1.0–0.1 mole/litre, calculated as titanium tetrachloride. If the concentrations of the reaction materials (organo-tin hydride and titanium tetrachloride) are higher than the above-mentioned limit, the uniformity of the reaction is not maintained, and it is difficult to remove the heat of reaction. Consequently, the resulting catalyst is lowered in activity, and substances soluble in the inert solvent are difficult to remove. If, on the other hand, the concentrations are below 0.05 mole/litre, the product is poisoned at an increasing degree by tiny amounts of impurities contained in the inert solvent, and such low concentrations are also disadvantageous in recovering the organo-tin compound. In practising the foregoing reaction, the order of addition of the organo-tin hydride and titanium tetrachloride is optional, and does not matter much. It is necessary however to take a sufficient precaution so as not to contact the system with oxygen and water.

The organo-tin hydride and titanium tetrachloride are reacted at the Sn—H/Ti molar ratio within the range of 0.5 to 6.0. It is preferable that the Sn—H/Ti molar ratio should be 0.8 to 5.0. If this ratio is below 0.5, the titanium tetrachloride is used in an amount more than necessary, resulting in a loss of titanium tetrachloride. The polymerisation activity of the resulting catalyst does not increase even if the molar ratio of Sn—H/Ti is raised above 6.0, and there is no advantage in using a great quantity of the organo-tin hydride.

The procedure for removing a part or whole of the hydrocarbon-soluble substances from the reaction product of organo-tin hydride and titanium tetrachloride is effected by allowing the reaction product to stand or subjecting it to centrifugal separation to thereby precipitate substances insoluble in a hydrocarbon solvent, and removing a predetermined amount (25–100%) of the supernatant liquid. When an amount of the solvent is small or when great quantities of hydrocarbon-soluble substances or all of them are to be removed, it is necessary to effect such treatments as washing and extraction subsequently to the foregoing treatment or filtering procedure. During the removal of the hydrocarbon-soluble substances, sufficient care must be exercised to prevent the reaction product from being in contact with oxygen and water.

As already mentioned, substantially all of the hydrocarbon-soluble substances need be removed from the system when the Sn—H/Ti molar ratio is lower than about 2, especially 1.5. Even if the Sn—H/Ti molar ratio is high, it is necessary to remove at least a quarter of the hydrocarbon-soluble substances, and preferably, at least half, advantageously substantially all of the hydrocarbon-soluble substances should be removed.

As the organo-aluminium compound used as a second component for the preparation of the catalyst of the invention, an alkyl aluminium compound having the formula:

$$R'_n AlX_{(3-n)}$$

wherein R' represents an alkyl group having 1 to 8 carbon atoms; X represents a hydrogen or halogen atom; and n represents a number of 2 or 3, is suitable. Preferable alkyl aluminium compounds include trialkyl aluminium compounds such as trimethyl aluminium, triethyl aluminium, tri-n-propyl aluminium, tri-n-butyl aluminium and triisobutyl aluminium; dialkyl aluminium halides such as diethyl aluminium chloride and diisobutyl aluminium chloride; and dialkyl aluminium hydrides such as diisobutyl aluminium hydride.

The organo-aluminium compound is reacted with the first component at a ratio such that the molar ratio of the aluminium to the titanium of the first component (Al/Ti) is in the range of 0.01 to 0.5. This reaction is conveniently effected in an inert hydrocarbon solvent used in the polymerisation in the presence or absence of isoprene. When it is carried out in the presence of isoprene, it is advisable to add the first component to the system in the last place. It has been confirmed that when the first component is prepared at the Sn—H/Ti molar ratio of above 1, substantially all of the titanium used remains in the first component. Hence, if the Sn—H/Ti molar ratio is above 1, the molar ratio of aluminium based on the titanium present in the first component is substantially the same as the molar ratio of aluminium based on the titanium used in preparing the first component. When the first component is prepared at the Sn—H/Ti molar ratio of less than 1, a part of the used titanium tetrachloride remains unreacted in the inert hydrocarbon solvent. When the first component is produced at the Sn—H/Ti molar ratio of less than 1, it is necessary to remove substantially all of the hydrocarbon-soluble substances. In this case, therefore, the number of moles of the titanium contained in the first component is nearly equal to the quotient obtained by dividing the weight (g) of the first component by the molecular weight of titanium trichloride ($TiCl_3$). An organo-aluminium compound is added at the Al/Ti molar ratio of 0.01–0.5 based on the calculated number of moles of titanium.

If the hydrocarbon solvent is not completely inert, for instance, because it contains impurities such as a small quantity of water, a part of the organo-aluminium compound would be consumed by reaction with said impurities. In such a case, therefore, a slightly excess amount of the organo-aluminium compound is used. It should be understood that the above-mentioned range of the Al/Ti molar ratio defines an amount of the organo-aluminium compound which participates in the reaction with the first component.

The polymerisation of isoprene in accordance with the invention is carried out in the presence of an inert hydrocarbon solvent while stirring and mixing the first component, organo-aluminium compound and isoprene. Any order of adding these materials can be employed so long as the first component and isoprene are not co-present in the absence of the organo-aluminium compound. The polymerisation temperature is in the range of 0° to 100° C., preferably 30° to 70° C. If the temperature is below 0° C., the rate of polymerisation is slow, and if it is above 100° C., it is difficult to obtain cis-1,4-polyisoprene having a high molecular weight to be practical. The amount of the catalyst may vary within the range of 0.01 to 20% by weight, preferably 0.1 to 5% by weight. During the preparation of the catalyst and the polymerisation, sufficient care should be taken to avoid contact with oxygen and water. Treatment of the polymerised product in a known manner gives polyisoprene.

An infrared spectrum analysis of the obtained polyisoprene has revealed that 90–98% of it is composed of cis-1,4 units, the remainder being of the 3,4-configuration and trans-1,4-configuration, and that it is substantially cis-1,4-polyisoprene.

An exact mechanism of the reaction between the organo-tin hydride and titanium tetrachloride has not yet been completely made clear, but it is believed that reduction of titanium tetrachloride with the organo-tin hydride takes place. For it is confirmed that the corresponding organo-tin chloride is formed with the generation of hydrogen. Since the used organo-tin hydride and the formed organo-tin chloride are soluble in a hydrocarbon solvent, a substantial amount of the organo-tin chloride can be recovered in a preferred embodiment of the invention in which substantially all of the hydrocarbon-soluble substances are removed from the system. The chloride can be easily reduced to an organo-tin hydride by, for instance, reducing it with lithium aluminium hydride or sodium amalgen, or reacting it with an Si—H containing compound after conversion into an organo-tin oxide, or pyrolysing it after conversion into an organo-tin formate, and can be repeatedly used to advantage for the production of a catalyst. Another important advantage of the invention is that the catalyst has a low aluminium content. Consequently, a polymer having a small ash content is obtained, which is easy to purify.

The following examples are presented to illustrate the invention further, and are not intended to be limitative. The molecular weight of cis-1,4-polyisoprene indicated in the example was calculated in accordance with the formula described in W. H. Beattie et al., J. Appl. Polymer Sci., 7, 507–514 (1963) from the viscosity measured with respect to its toluene solution at 30° C. The content of the cis-1,4 configuration of the polymer was measured in accordance with the method of I. Kössler et al. [Collection Czech. Chem. Commum., 29, (10) 2419–2427 (1964)].

EXAMPLE 1

A 50 cc. glass ampoule was flushed with nitrogen, and was charged by an injector with 30 cc. of n-hexane, 0.87 g. (3 mmoles) of tri-n-butyl tin monohydride and 40.57 g. (3 mmoles) of $TiCl_4$ at the Sn—H/Ti molar ratio of 1. They were reacted for one hour at 29° C.

The reaction mixture was subjected to centrifugal separation for 10 minutes at 3,000 r.p.m. All of the resulting supernatant liquid was removed, and with the addition of 30 cc. of hexane, the n-hexane- insoluble substances were dispersed in n-hexane by shaking. The dipersion was then subjected to centrifugal separation, and the supernatant liquid was removed. This washing procedure was further repeated three times. To the obtained n-hexane-isoluble substances were added 30 cc. of n-hexane, 0.6 mmole of an n-heptane solution of triethyl aluminium and 7.20 g. of isoprene (the Al/Ti molar ratio being 0.2), and the mixture was reacted for 24 hours at 50° C. while shaking it. The resulting polymer was immersed overnight in 100 cc. of a mixed solvent (4:1) of benzene-methanol containing an anti-oxidant (phenyl β-naphthylamine). Addition of 200 cc. of methanol gave a rubbery polymer. It was swelled with benzene, and freeze-dried. The yield of the rubbery polyisoprene was found to be 6.06 g. (84.2%). The polymer was then dissolved into benzene to a concentration of 2% by weight, and the benzene solution was subjected to centrifugal separation for 10 minutes at 3,000 r.p.m. to give 0.68 g. (11.2% by weight; this will be referred to hereinafter as the gelled matter content) of a polymer insoluble in benzene. The benzene solution was further freeze-dried to separate a soluble polymer, which was found to have an intrinsic viscosity of 1.51 as measured with respect to its toluene solution at 30° C., which corresponds to 212,000 in terms of the viscosity average molecular weight. According to the infrared absorption spectrum of its carbon disulphide solution, the resulting polyisoprene had a cis-1,4 content of 95.4%.

For the sake of comparison, isoprene was added to a system obtained by reacting tri-n-butyl tin monohydride with $TiCl_4$ under the same conditions as employed above, and the polymerisation was conducted at 30° C. The conversion was 9.5%, and the obtained polymer was resinous.

When n-hexane-soluble substances were removed by a centrifugal separator from the reaction product of tri-n-butyl tin monohydride and $TiCl_4$, and without adding triethyl aluminium, isoprene was polymerised at 30° C., the conversion was 10.5%, but the obtained polymer was resinous.

Furthermore, when isoprene was polymerised by addition of a varying amount of triethyl aluminium to a system from which the n-hexane-soluble substances had been partly removed, or had not been removed at all, results were obtained as shown in Table 1. In this case, the conditions were the same as those employed above except that the polymerisation temperature was 30° C. There was change in polymerisation activity by changing the polymerisation conditions, but a rubbery polymer was not obtained at all.

The "resinous polymer" referred to herein is not a rubbery polymer, but a polymer similar to an ordinary thermoplastic resin. A resinous polymer obtained by the polymerisation of isoprene has a low cis-1,4 content.

TABLE 1

| Run No. | Amount of n-hexane-soluble portion removed,[1] percent | Amount of triethyl aluminium (mmole) | Al/Ti molar ratio | Conversion, percent | Obtained polymer |
|---|---|---|---|---|---|
| 1 | 0 | 0.30 | 0.10 | 12.7 | Resinous polymer. |
| 2 | 0 | 0.60 | 0.20 | 40.6 | Do. |
| 3 | 0 | 0.90 | 0.30 | 35.6 | Do. |
| 4 | 0 | 1.50 | 0.50 | 20.4 | Do. |
| 5 | 25 | 0.40 | 0.13 | 27.7 | Do. |
| 6 | 25 | 0.80 | 0.27 | 45.3 | Do. |
| 7 | 25 | 1.20 | 0.40 | 77.6 | Do. |
| 8 | 50 | 0.40 | 0.13 | 20.4 | Do. |
| 9 | 50 | 0.80 | 0.27 | 38.9 | Do. |
| 10 | 50 | 1.20 | 0.40 | 100.0 | Do. |
| 11 | 75 | 0.40 | 0.13 | 11.0 | Do. |
| 12 | 75 | 0.80 | 0.27 | 98.5 | Do. |
| 13 | 75 | 1.20 | 0.40 | 87.5 | Do. |

[1] The amount of n-hexane-soluble portion removed is the percentage of the removed solution based on 30 cc. of n-hexane initially added. The polymerisation reaction was conducted by adding fresh n-hexane in an amount corresponding to the amount of the solution removed.

EXAMPLE 2

To the n-hexane-insoluble matter obtained in the same manner as in Example 1 were added 0.9 mmole of diethyl aluminium chloride as its n-heptane solution and 5.42 g. of isoprene at the Al/Ti molar ratio of 0.3, and the polymerisation was conducted for 24 hours at 50° C. There was obtained 4.86 g. (89.7%) of polyisoprene having a gelled matter content of 34.0%, an intrinsic viscosity of 1.24, a viscosity average molecular weight of 162,000 and a cis-1,4 content of 94.2%.

EXAMPLE 3

To the n-hexane-insoluble matter obtained in the same manner as in Example 1 were added 0.5 mmole of an n-heptane solution of triisobutyl aluminium and 6.79 g. of isoprene at the Al/Ti molar ratio of 0.15, and the polymerisation was conducted for 24 hours at 50° C. There was obtained 6.31 g. (93.0%) of polyisoprene having a gelled matter content of 15.5%, an intrinsic viscosity of 1.55, a viscosity average molecular weight of 534,000 and a cis-1,4 content of 96.2%.

EXAMPLE 4

A 50 cc. glass ampoule was flushed with nitrogen, and was charged by an injector with 30 cc. of n-hexane, 0.62 g. (3 mmoles) of triethyl tin monohydrine and 0.57 g. (3 mmoles) of $TiCl_4$. They were reacted for one hour at 30° C. The reaction mixture was treated in quite the same manner as in Example 1 to separate n-hexane-insoluble matter. To the n-hexane-insoluble matter were added 30 cc. of n-hexane, 0.6 mmole of an n-hexane solution of triethyl aluminium and 6.80 g. of isoprene, and the polymerisation was conducted in the same manner as in Example 1. There was obtained a rubbery polyisoprene at 80.2% yield having a gelled matter content of 8.9%, an intrinsic viscosity of 1.62, and a cis-1,4 content of 94.8%.

EXAMPLE 5

To an n-hexane-insoluble matter obtained by treating 0.388 g. (1.65 mmoles) of dibutyl tin dihydride and 0.57 g. of $TiCl_4$ in the same manner as in Example 1 were added 30 cc. of n-hexane and 0.6 mole of an n-hexane solution of triethyl aluminium, and also 6.95 g. of isoprene. The polymerisation was conducted in the same manner as in Example 1. There was obtained a rubbery polyisoprene at 69.8% yield having a gelled matter content of 9.4%, an intrinsic viscosity of 1.70, and a cis-1,4 content of 96.0%.

conducted for 24 hours at 30° C. The resulting polymer was treated in the same manner as in Example 7. The results are shown in Table 2.

TABLE 2

| Run No. | Amount of triethyl aluminium, mmole | Al/Ti molar ratio | Amount of n-hexane solution removed, percent | Conversion, percent | Intrinsic viscosity of the polymer obtained | Cis-1,4 content, percent |
|---|---|---|---|---|---|---|
| 1 | 0.80 | 0.27 | 25 | 64.6 | 0.91 | 95.1 |
| 2 | 0.40 | 0.13 | 50 | 61.6 | 1.34 | 95.4 |
| 3 | 0.80 | 0.27 | 50 | 83.4 | 1.28 | 95.5 |
| 4 | 0.40 | 0.13 | 75 | 87.8 | 1.41 | 96.2 |

EXAMPLE 6

An n-hexane-insoluble matter was prepared by using corresponding amounts of triphenyl tin monohydride and tripropyl tin monohydride in place of the tri-n-butyl tin monohydride employed in Example 1, and by using it, the polymerisation of isoprene was conducted in almost the same manner as in Example 1. In the preparation of the n-hexane-insoluble matter, 3 mmoles each of the organo-tin monohydride and titanium chloride was used. There was obtained a rubbery polyisoprene at a conversion in the range of 70 to 100%. The obtained polyisoprene had a gelled matter content of less than 20%, an intrinsic viscosity of 1.3–1.7, and a cis-1,4 content of 94–97%.

EXAMPLE 7

A 50 cc. glass ampoule was flushed with nitrogen, and was charged with 30 cc. of n-hexane, 2.4 cc. (9.06 mmoles) of tri-n-butyl tin hydride and 0.33 cc. (3.0 mmoles) of $TiCl_4$ at the Sn—H/Ti molar ratio of 3.02. They were reacted for one hour at 30° C. The reaction mixture was subjected to centrifugal separation for 10 minutes at 3,000 r.p.m. All of the supernatant liquid was removed, and with the addition of 30 cc. of n-hexane, the n-hexane-insoluble matter was dispersed into the fresh n-hexane by shaking. The dispersion was subjected to centrifugal separation under the same conditions as above, and the supernatant liquid was removed. This procedure was further repeated three times. Thereafter, 30 cc. of n-hexane, 0.900 mmole of an n-heptane solution of triethyl aluminium, and 7.18 g. of isoprene were added in this order, and the ampoule was sealed. The Al/Ti molar ratio was 0.30. The reaction was effected for 24 hours at 50° C. The polymer withdrawn from the ampoule was immersed overnight in a mixed solvent (4:1) of benzene-methanol. The resulting polymer was precipitated by addition of methanol. It was swelled with benzene, and freeze-dried. There was obtained 7.08 g. of a rubber polymer at a conversion of 98.6%. The obtained polymer was dissolved in benzene to a concentration of about 2% by weight. The solution was treated with a centrifugal separator at 3,000 r.p.m. to give 0.80 g. (11.3% by weight based on the total amount of the polymer) of a polymer insoluble in benzene. The polymer soluble in benzene was recovered by freeze-drying the benzene solution. The polymer had an intrinsic viscosity of 2.04 as calculated from the viscosity of a toluene solution of this polymer at 30° C., which corresponds to a viscosity average molecular weight of 321,000. The cis-1,4 content measured by the infrared absorption spectrum of a carbondisulphide solution of the polymer was 95.6%.

EXAMPLE 8

In the same manner as in Example 7, 2.4 cc. of tri-n-butyl tin monohydride and 0.33 cc. of $TiCl_4$ were reacted, and the product was subjected to centrifugal separation. From the supernatant liquid, 25%, 50% or 75%, based on 30 cc. of n-hexane added, of the n-hexane solution was removed. Normal hexane in an amount equal to that of the solution removed, an n-heptane solution of triethyl aluminium in an amount indicated in Table 2, and 6.88 g. of isoprene were added, and the polymerisation was For the sake of comparison, the polymerisation of isoprene was conducted at a temperature of 30° C. with the use of a mere mixture of 2.4 cc. of tri-n-butyl tin monohydride and 0.33 cc. of $TiCl_4$ or a catalyst obtained by adding triethyl aluminium to this mixture without removing the n-hexane-soluble substances therefrom. The polymerisation conditions and procedures were the same as those of Example 7. The results are shown in Table 3 below.

TABLE 3

| Run No. | Amount of triethyl aluminium, mmole | Al/Ti molar ratio | Conversion, percent | Intrinsic viscosity of the polymer obtained | Cis-1,4 content percent |
|---|---|---|---|---|---|
| 1 | 0 | — | 65.0 | 0.80 | 95.8 |
| 2 | 0.30 | 0.10 | 77.0 | 0.70 | 95.1 |
| 3 | 0.60 | 0.20 | 57.1 | 0.69 | 95.0 |
| 4 | 0.90 | 0.30 | 60.0 | 0.60 | 95.4 |

EXAMPLE 9

To an n-hexane-insoluble matter obtained by reaction of tri-n-butyl tin monohydride and $TiCl_4$ in the same manner as in Example 7 were added 30 cc. of n-hexane, 0.6 mmole (the Al/Ti molar ratio of 0.2) of an n-hexane solution of diethyl aluminium chloride and 6.80 g. of isoprene. The polymerisation was conducted for 24 hours at 50° C. The conversion was 89.8%. The resulting polymer had a gelled matter content of 10.4%, an intrinsic viscosity of 1.41 and a cis-1,4 content of 94.8%.

EXAMPLE 10

The polymerisation of isoprene was conducted in quite the same manner as in Example 9 except that 0.6 mmole of tri-iso-butyl aluminium was used in place of diethyl aluminium chloride. The conversion was 96.0%. The resulting polymer had a gelled matter content of 12.4%, an intrinsic viscosity of 1.68, and a cis-1,4 content of 96.0%.

EXAMPLE 11

To an n-hexane-insoluble matter obtained by reaction of 0.89 cc. (4.52 mmoles) of dibutyl tin dihydride with 0.33 cc. (3.0 mmoles) of $TiCl_4$ at the Sn—H/Ti molar ratio of 3.01 were added 30 cc. of n-hexane and 0.6 mmole of tri-iso-butyl aluminium, and the polymerisation of isoprene was conducted. The conversion was 92.0%. The resulting polymer had a gelled matter content of 10.4%, an intrinsic viscosity of 1.30, and a cis-1,4 content of 95.1%.

EXAMPLE 12

To an n-hexane-insoluble matter obtained by reaction of 9.0 mmoles of tri-n-propyl tin hydride with 3.0 mmoles of $TiCl_4$ in the same manner as in Example 7 were added 30 cc. of n-hexane and 0.6 mmoles of tri-iso-butyl aluminium, and the polymerisation of isoprene was conducted. The conversion was 94.1%. The resulting polymer had a gelled matter content of 8.2% and a cis-1,4 content of 94.5%.

We claim:
1. A process for the production of polyisoprene having at least 90% cis-1,4-configuration comprising contacting isoprene in an inert hydrocarbon solvent with a catalyst, said process being characterized in that said catalyst is prepared by reacting (1) a first component obtained by the reaction of an organo-tin hydride of the formula $R_mSnH_{4-m}$ wherein R is a hydrocarbyl group and $n$ is an integer of 1–3 with titanium tetrachloride in an inert hydrocarbon solvent, the molar ratio of the Sn—H bond of said organo-tin hydride to the titanium being within the range of 0.5 to 6.0, and subsequent removal of at least a quarter of the hydrocarbon-soluble substances from the reaction mixture, with (2) an organo-aluminum compound of the formula $R'_nAlX_{3-n}$ wherein R' is an alkyl group of 1–8 carbon atoms; X is a hydrogen or halogen atom; and $n$ is an integer of 2 or 3 as a second component, the molar ratio of the aluminum to the titanium being within the range of 0.01 to 0.5.

2. A process for the production of polyisoprene having at least 90% cis-1,4-configuration comprising contacting isoprene in an inert hydrocarbon solvent with a catalyst, said process being characterized in that said catalyst is prepared by reacting (1) a first component obtained by the reaction of an organo-tin hydride of the formula $R_mSnH_{4-m}$ wherein R is a hydrocarbyl group and $n$ is an integer of 1–3 with titanium tetrachloride in an inert hydrocarbon solvent, the molar ratio of the Sn—H bond of said organo-tin hydride to the titanium being within the range of 0.5 to 6.0, and subsequent removal of substantially all of the hydrocarbon-soluble substances from the reaction mixture, with (2) an organo-aluminum compound of the formula $R'_nAlX_{2-n}$ wherein R' is an alkyl group of 1–8 carbon atoms; X is a hydrogen or halogen atom; and $n$ is an integer of 2 or 3 as a second component, the molar ratio of the aluminum to the titanium being within the range of 0.01 to 0.5.

3. The process of claim 2 wherein the organo-tin hydride is reacted with the titanium tetrachloride at a ratio such that the molar ratio of the Sn—H bond to the titanium is within the range of 0.5 to 2.0.

4. The process of claim 1 wherein the organo-tin hydride is reacted with the titanium tetrachloride at a ratio such that the molar ratio of the Sn—H bond to the titanium is within the range of about 3.0 to 6.0.

5. The process of claim 1 wherein the organo-tin hydride is a trialkyl tin monohydride in which the alkyl group has 1 to 8 carbon atoms.

6. The process of claim 2 wherein the organo-tin hydride is a trialkyl tin monohydride in which the alkyl group has 1 to 8 carbon atoms.

7. The process of claim 1 wherein the organo-tin hydride is a triaryl tin monohydride in which the aryl group has 6 to 8 carbon atoms.

8. The process of claim 2 wherein the organo-tin hydride is a triaryl tin monohydride in which the aryl group has 6 to 8 carbon atoms.

9. The process of claim 1 wherein the organo-tin hydride is a dialkyl tin dihydride in which the alkyl group has 1 to 8 carbon atoms.

10. The process of claim 2 wherein the organo-tin hydride is a dialkyl tin dihydride in which the alkyl group has 1 to 8 carbon atoms.

References Cited
UNITED STATES PATENTS 3,222,348  12/1965  Duck et al. _____ 260—94.3
3,432,515  3/1969   Okuya et al. _____ 260—94.3

JOSEPH L. SCHOFER, Primary Examiner

R. A. GAITHER, Assistant Examiner